United States Patent
Jia et al.

(10) Patent No.: US 8,803,744 B2
(45) Date of Patent: Aug. 12, 2014

(54) COVER FOR ELECTRONIC DEVICE

(75) Inventors: Xiao-Feng Jia, Shenzhen (CN); Yong Yan, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 416 days.

(21) Appl. No.: 13/289,117

(22) Filed: Nov. 4, 2011

(65) Prior Publication Data

US 2013/0002493 A1    Jan. 3, 2013

(30) Foreign Application Priority Data

Jun. 28, 2011 (CN) .......................... 2011 1 20222492

(51) Int. Cl.
*H01Q 1/24*    (2006.01)

(52) U.S. Cl.
USPC .......................................... 343/702; 343/873

(58) Field of Classification Search
CPC ............. H01Q 1/24; H01Q 1/38; H01Q 1/40; H01Q 1/243
USPC .............. 343/700 MS, 702, 872, 873; 29/600
See application file for complete search history.

(56) References Cited

U.S. PATENT DOCUMENTS 8,654,029 B2 * 2/2014 Fan et al. ...................... 343/873
2014/0079876 A1 * 3/2014 Katayama et al. ........... 427/98.6

* cited by examiner

*Primary Examiner* — Tan Ho
(74) *Attorney, Agent, or Firm* — Novak Druce Connolly Bove + Quigg LLP

(57) ABSTRACT

An electronic device cover includes a base body, a first antenna and a second antenna. The first antenna is at least partially made by laser direct structuring. Both the first antenna and the second antenna are located in the base body by insert-molding.

12 Claims, 1 Drawing Sheet

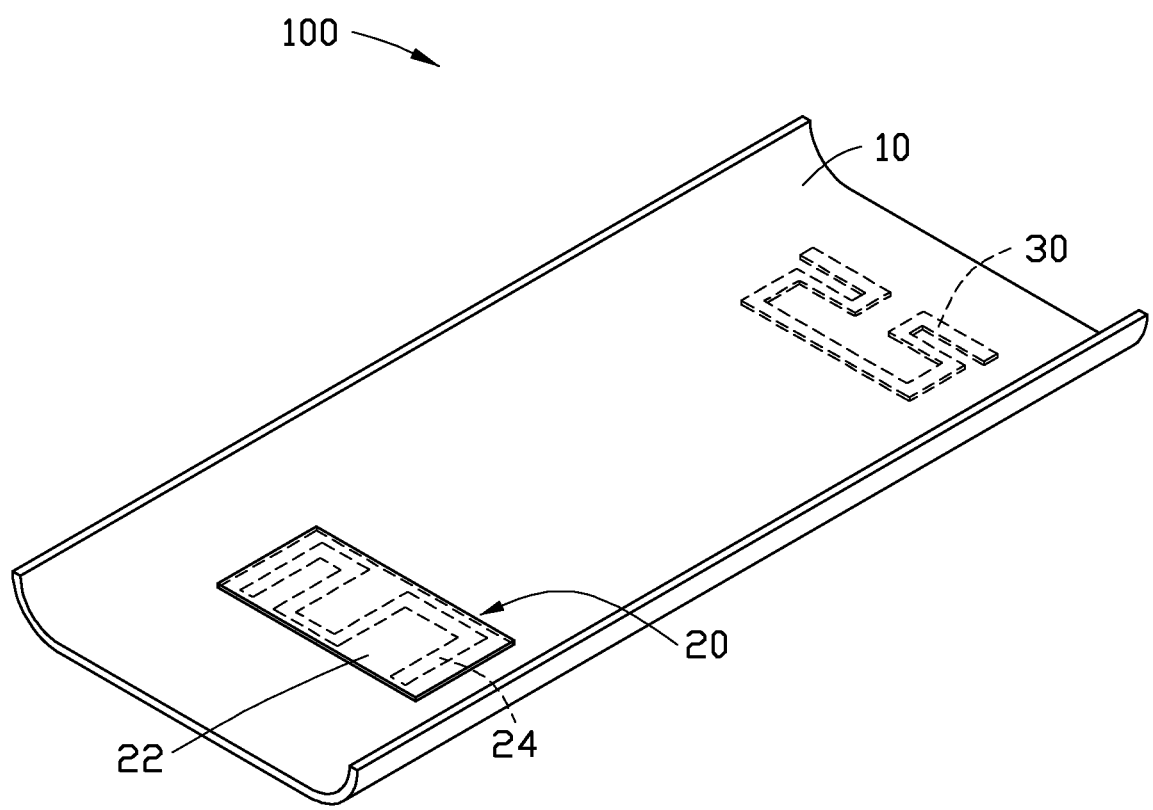

COVER FOR ELECTRONIC DEVICE

BACKGROUND

1. Technical Field

The disclosure generally relates to covers used for electronic devices.

2. Description of the Related Art

Electronic devices (e.g. mobile phones) may include a housing and an antenna for telecommunication. Due to the trend towards smaller electronic devices, space available for mounting antennas is reduced. The antenna may also be manually adhered to printed circuit board with a low production rate.

Therefore, there is room for improvement within the art.

BRIEF DESCRIPTION OF THE DRAWINGS

Many aspects of the exemplary cover for electronic device can be better understood with reference to the following drawings. The components in the various drawings are not necessarily drawn to scale, the emphasis instead being placed upon clearly illustrating the principles of the exemplary cover for electronic device. Moreover, in the drawings, like reference numerals designate corresponding parts throughout the diagrams.

FIGURE is an isometric view of an exemplary cover for electronic device.

DETAILED DESCRIPTION

FIG. 1 shows an exemplary electronic device cover 100. The cover 100 includes a base body 10, a first antenna 20 and a second antenna 30. Both the first antenna 20 and the second antenna 30 are formed in the base body 10 by insert-molding.

The base body 10 may be molded from thermosetting plastic being one or more selected from a group of polyethylene, polyvinyl alcohol, polypropylene, polycarbonate, polymethyl methacrylate, acrylonitrile butadiene styrene, and polystyrene.

The first antenna 20 includes an antenna base 22 and an antenna radiator 24. The antenna radiator 24 may be formed on antenna base 22 by laser direct structuring (LDS). The base body 10 is formed on the radiator 24. The second antenna 30 is a metal antenna.

The antenna base 22 can be formed by injecting molding. Material of the antenna base 22 can be a mixture of materials consisting of thermoplastic, organic filling substances, and laser direct structuring material. The thermoplastic can be polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any combination thereof. The antenna base 22, according to an exemplary embodiment, is made of polycarbonate. The organic filling substances can be silicic acid and/or silicic acid derivatives. The laser direct structuring material can be non-conductive spinel-based inorganic oxide, such as spinel type copper. The non-conductive spinel-based inorganic oxide can be activated by laser to precipitate metallic crystal nuclei covering the antenna base 22.

The antenna radiator 24 is made by selectively activating a portion of the base body 22 with a laser and plating the activated portion.

An exemplary embodiment of a method for making the cover 100 may include the following steps:

An injection molding machine is provided. The injection molding machine includes a first molding chamber. The mixture is injected into the first molding chamber to form the antenna base 22. A portion of the antenna base 22 is activated with a laser. The non-conductive oxide of the portion of the antenna base 22 is activated by laser direct structuring (LDS) to precipitate metallic crystal nuclei covering the metal area of the antenna base 22. The metal area is conductive.

The metal area is plated to form the antenna radiator 24 using a plating process. The plating process can be an electroplating or a chemical plating to form the plating layer. Thus the first antenna 20 has been manufactured.

An insert-molding molding machine is provided. The injection molding machine includes a second molding chamber.

The first antenna 20 and the second antenna 30 are positioned in the second molding chamber.

Liquid thermosetting plastic is injected into the second molding chamber to form the base body 10 on first antenna 20 and the second antenna 30 to manufacture the cover 100. The liquid thermosetting plastic may be one or more selected from a group of polyethylene, polyvinyl alcohol, polypropylene, polycarbonate, polymethyl methacrylate, acrylonitrile butadiene styrene, and polystyrene.

By insert molding the first antenna 20 and the second antenna 30 into the base body 10, the electronic device cover can save inside mounting space of the electronic device, and make the electronic device more compact.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A cover for electronic device, comprising:
a base body;
a first antenna at least partially made by laser direct structuring;
a second antenna; and
wherein both the first antenna and the second antenna located in the base body by insert-molding.

2. The cover as claimed in claim 1, wherein the first antenna comprises an antenna base and an antenna radiator, and the antenna radiator is located between the base body and the antenna base.

3. The cover as claimed in claim 2, wherein the antenna radiator is formed by selectively activating a portion of the base body with a laser and then plating the activated portion.

4. The cover as claimed in claim 2, wherein the antenna base comprises laser direct structuring material, thermoplastic and organic filling substances.

5. The cover as claimed in claim 4, wherein the thermoplastic is polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any combination thereof.

6. The cover as claimed in claim 4, wherein the laser direct structuring material is spinel-based inorganic oxide.

7. The cover as claimed in claim 6, wherein the laser direct structuring material is made of spinel copper.

8. The cover as claimed in claim 4, wherein the laser direct structuring material is activated by laser to form a metal area, the metal area electroplated to form the antenna radiator.

9. The cover as claimed in claim 4, wherein the organic filling substances comprise silicic acid and/or silicic acid derivatives.

10. The cover as claimed in claim 1, wherein the base body is molded by thermosetting plastic.

11. The cover as claimed in claim 10, wherein the thermosetting plastic is one selected from a group of polyethylene, polyvinyl alcohol, polypropylene, polycarbonate, polymethyl methacrylate, acrylonitrile butadiene styrene, and polystyrene.

12. The cover as claimed in claim 1, wherein the second antenna is a metal antenna.

* * * * *